(12) United States Patent
Wakita

(10) Patent No.: US 7,514,826 B2
(45) Date of Patent: Apr. 7, 2009

(54) STATOR COIL COOLING AND METHOD OF MANUFACTURING

(75) Inventor: Tetsuo Wakita, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 217 days.

(21) Appl. No.: 10/545,232

(22) PCT Filed: Feb. 11, 2004

(86) PCT No.: PCT/IB2004/000342

§ 371 (c)(1),
(2), (4) Date: Jan. 4, 2006

(87) PCT Pub. No.: WO2004/073144

PCT Pub. Date: Aug. 26, 2004

(65) Prior Publication Data

US 2006/0145548 A1 Jul. 6, 2006

(30) Foreign Application Priority Data

Feb. 14, 2003 (JP) .............................. 2003-036606

(51) Int. Cl.
*H02K 9/20* (2006.01)
(52) U.S. Cl. .......................... 310/54; 310/201; 310/208
(58) Field of Classification Search ... 310/54; H02K 9/19

See application file for complete search history.

(56) References Cited

U.S. PATENT DOCUMENTS

| | | | |
|---|---|---|---|
| 1,001,843 A | | 6/1911 | Howell |
| 2,390,130 A | * | 12/1945 | Sigmund et al. ............... 310/54 |
| 3,098,941 A | * | 7/1963 | Willyoung ................... 310/262 |
| 3,963,950 A | * | 6/1976 | Watanabe et al. ............. 310/54 |
| 6,239,528 B1 | * | 5/2001 | Sawada et al. ............... 310/179 |
| 6,509,665 B1 | * | 1/2003 | Nishiyama et al. .......... 310/215 |
| 6,927,510 B1 | * | 8/2005 | Beitelman et al. ............. 310/54 |
| 2002/0005671 A1 | * | 1/2002 | Welke et al. .................. 310/52 |
| 2002/0163256 A1 | * | 11/2002 | Tajima ........................ 310/12 |

FOREIGN PATENT DOCUMENTS

DE 197 49 108 C1 4/1999

(Continued)

OTHER PUBLICATIONS

Chinese Office Action w/English translation thereof.

*Primary Examiner*—Quyen P Leung
*Assistant Examiner*—Naishadh N Desai
(74) *Attorney, Agent, or Firm*—Kenyon & Kenyon LLP

(57) ABSTRACT

A stator coil module facilitating the manufacture of an electric rotating machine is provided. The stator coil module is provided with a stator coil (1), a cooling pipe (2), and a mold member (3). The cooling pipe (2) is provided separately from the stator coil and is disposed along it. The mold member molds the stator coil (1) and the cooling pipe (2). A hole surrounded by the stator coil is formed in the mold member. The cooling pipe includes a coolant outlet (2*b*) at one end thereof and a coolant inlet at the other end thereof. The stator coil module is further provided with a coil lead wire for supplying the stator coil with electric power. The ends of the cooling pipe and the coil lead wire are disposed on the side of one end of the stator coil module.

7 Claims, 11 Drawing Sheets

FOREIGN PATENT DOCUMENTS

| | | |
|---|---|---|
| EP | 0 342 554 A1 | 11/1989 |
| EP | 1 317 048 A2 | 6/2003 |
| JP | 50-084802 A | 7/1975 |
| JP | 59-126554 U | 8/1984 |
| JP | 07079544 A | 3/1995 |
| JP | 07322566 A | 12/1995 |
| JP | 10-327558 A | 12/1998 |
| JP | 11146606 A | 5/1999 |
| JP | 2002186211 A | 6/2002 |
| JP | 200247806 A | 8/2002 |

* cited by examiner

STATOR COIL COOLING AND METHOD OF MANUFACTURING

This is a 371 national phase application of PCT/IB04/00342 filed 11 Feb. 2004, claiming priority to Japanese Patent Application No. 2003-036606 filed 14 Feb. 2003, the contents of which are incorporated herein by reference.

BACKGROUND OF THE INVENTION

1. Field of Invention

The invention relates to a stator coil module, a method of manufacturing the stator coil module, and an electric rotating machine. In particular, the invention relates to an electric rotating machine mounted in a vehicle, a stator coil module employed in the electric rotating machine, and a method of manufacturing the stator coil module.

2. Description of the Related Art

An art for cooling a stator in an electric rotating machine (a motor, a generator, or a motor-generator) is disclosed, for example, in Japanese Patent Application Laid-Open No. 2002-186211.

In the electric rotating machine disclosed in the aforementioned publication, a plate is provided between segmental cores, and the plate is sealed with resin. It is difficult to perform an operation of molding the plate with resin.

In the electric rotating machine disclosed in the aforementioned publication, a slot serves as a cooling liquid passage, and a coil is provided in the cooling liquid passage. Thus, the number of combinations of a cooling liquid flowing through the cooling liquid passage and a material for the cores is limited.

SUMMARY OF THE INVENTION

The invention provides a stator coil module and an electric rotating machine which facilitate the assembly of the electric rotating machine.

As one aspect of the invention, a stator coil module is provided. This stator coil module comprises a stator coil, a cooling pipe, and an insulating member. The stator coil is formed by winding a coil strand a plurality of times. The cooling pipe is provided separately from the stator coil and is disposed along an outer periphery of the stator coil. The insulating member molds the stator coil and the cooling pipe and forms a hole in a space defined by an inner periphery of the stator coil.

In the construction as mentioned herein, since the stator coil and the cooling pipe are integrated with each other by being molded with the insulating member, a motor can be constructed only by fitting the stator core into the hole and then arranging the stator core integrated with the stator coil. As a result, it is possible to provide a stator coil module that makes it possible to construct a motor in simple steps.

In addition, since the cooling pipe is located separately from the stator coil, it is possible to make a selection from great varieties of materials constituting the stator coil and great varieties of qualities of a cooling liquid flowing through the cooling pipe.

It is preferable that the cooling pipe be substantially formed in a U-shape.

In this case, it is preferable that the stator coil module further comprise a conductive member for supplying the stator coil with electric power. The cooling pipe includes a cooling liquid outlet at one end thereof and a cooling liquid inlet at the other end thereof. The ends of the cooling pipe and the conductive member are disposed on the side of one end of the stator coil module. In this case, since the conductive member and the ends of the cooling pipe are concentratively disposed on the side of one end of the stator coil module, electric power and the cooling liquid can be supplied to the stator coil module easily.

Furthermore in this case, it is preferable that the conductive member be a coil lead wire.

Further, it is preferable that an insulator be provided between the stator coil and the cooling pipe. According to this construction, the insulating performance between the stator coil and the cooling pipe is further enhanced.

In this case, a plurality of holes may be formed in the insulator. Furthermore in this case, it is preferable that the holes be filled with the insulating member. This construction results in a reduction in a thermal resistance between the stator coil and the cooling pipe, so that an excellent cooling capacity is obtained.

Further, the coil strand constituting the stator coil may be rectangular in cross-sectional shape. This construction makes it possible to reliably ensure a space for arrangement of the cooling pipe while enlarging a cross-sectional area of conductive layers.

Further, the stator coil module may further comprise a connection block having a cooling pipe connection portion for connecting the cooling pipe to an external object and a conductive member connection portion for connecting the conductive member to an external object. According to this construction, since the conductive member connection portion and the cooling pipe connection portion are formed in the connection block, a step of mounting a pipe line and a lead wire is omitted.

As another aspect of the invention, a method of manufacturing a stator coil module is provided. This method comprises the steps of forming a stator coil by winding a coil strand, positioning a cooling pipe separately from the stator coil such that the cooling pipe extends along the stator coil, and molding the stator coil and the cooling pipe such that a hole is formed in a space defined by an inner periphery of the stator coil.

According to this construction, since the stator coil module can be manufactured by molding the cooling pipe and the stator coil with the insulating member, the stator coil module can be manufactured in simple steps.

In this case, it is preferable that the cooling pipe be substantially formed in a U-shape.

Furthermore in this case, it is preferable that the conductive member and both the ends of the cooling pipe be disposed on the side of one end of the stator coil module. Furthermore in this case, it is preferable that the conductive member be a coil lead wire.

Further, it is preferable that an insulator be provided between the stator coil and the cooling pipe. In this case, a plurality of holes may be formed in the insulator. Furthermore in this case, it is preferable that the holes be filled with the insulating member.

Further, the coil strand constituting the stator coil may be rectangular in cross-sectional shape.

Further, the method of manufacturing the stator coil module may further comprise the step of forming a connection block having a cooling pipe connection portion for connecting the cooling pipe to an external object and a conductive member connection portion for connecting the conductive member to an external object.

In addition, as still another aspect of the invention, an electric rotating machine having a stator coil module is provided. This electric rotating machine comprises a rotational shaft, a stator, and a cooling pipe. The rotational shaft is fitted with a rotor. The stator is provided around the rotational shaft, and includes a stator core and a stator coil that is wound around at least part of the stator core such that a winding axis thereof becomes unparallel to the rotational shaft. The cooling pipe is provided separately from the stator coil, and is disposed along the stator coil.

According to this construction, the cooling pipe is disposed at a location different from the location of the stator coil. Unlike the case of the related art, since the stator coil is not disposed in the cooling pipe, it is possible to make a selection from great varieties of cooling liquids (coolants) flowing through the cooling pipe and great varieties of materials constituting the stator coil. Hence, the stator coil can be made, for example, of copper as a material exhibiting a low resistance, so that the amount of heat generated by the stator coil can be reduced. Also, water as a material exhibiting a high thermal capacity can be caused to flow through the cooling pipe. In this case, a cooling capacity of the water is enhanced.

Further, it is preferable that the stator coil and the cooling pipe form a stator coil module by being molded with an insulating member such that a hole is formed in a space defined by an inner periphery of the stator coil.

It is preferable that the cooling pipe be substantially formed in a U-shape.

In this case, it is preferable that the stator coil module is provide with a conductive member for supplying the stator coil with electric power, that the cooling pipe have a cooling liquid outlet at one end thereof and a cooling liquid inlet at the other end thereof, and that the ends of the cooling pipe and the conductive member be disposed on the side of one end of the stator coil module.

Furthermore in this case, it is preferable that a plurality of stator coil modules each of which is constructed by fitting the stator core into the hole of the stator coil be disposed along a circumferential direction of the rotational shaft.

According to this construction, the electric rotating machine can be constructed by fitting the stator cores into the holes of the stator coil modules and arranging the stator cores in the circumferential direction. Hence, unlike the case of the related art, there is no need to mold the stator cores with resin after having mounted them in the electric rotating machine. As a result, the electric rotating machine can be manufactured in simple steps.

BRIEF DESCRIPTION OF THE DRAWINGS

The above-mentioned objects, features, advantages, technical and industrial significance of this invention will be better understood by reading the following detailed description of the exemplary embodiments of the invention, when considered in connection with the accompanying drawings, in which.

DETAILED DESCRIPTION OF PREFERRED EMBODIMENTS

Figure 1:
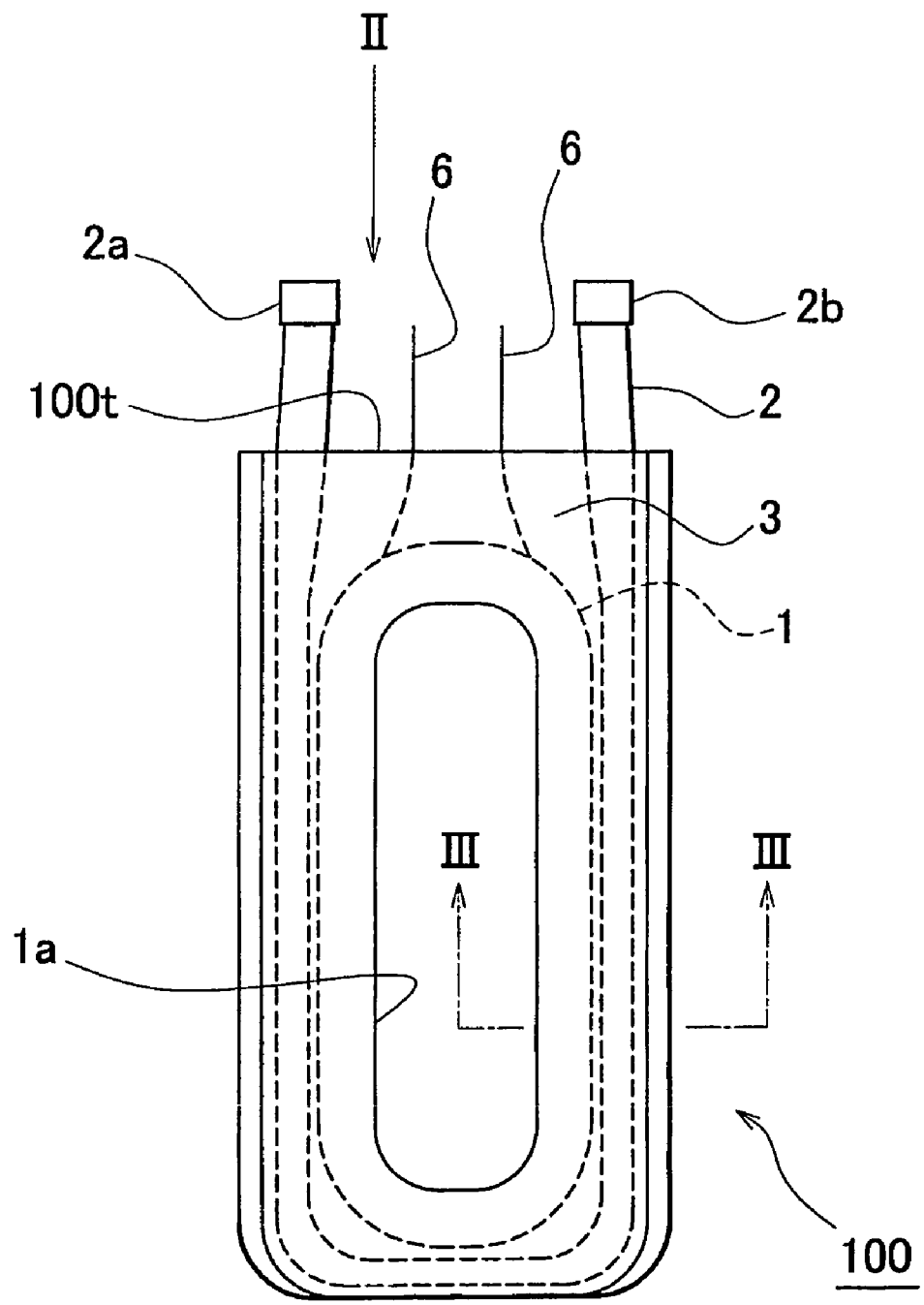
FIG. 1 is a plan view of a stator coil module in accordance with a first embodiment of the invention.

In the following description, the invention will be described in more detail in terms of exemplary embodiments.

The construction of a stator coil module 100 in accordance with the first embodiment of the invention will be described with reference to FIGS. 1 and 2. The stator coil module 100 is provided with a stator coil 1, a cooling pipe 2, and a mold member 3. The cooling pipe 2 is provided separately from the stator coil 1 and is disposed along it. The mold member 3 serves as an insulating member for molding the stator coil 1 and the cooling pipe 2. A hole 1a surrounded by the stator coil 1 is formed in the mold member 3.

The stator coil module 100 is further provided with a coil lead wire 6 as a conductive member for supplying the stator coil 1 with electric power. The cooling pipe 2 includes a cooling liquid outlet at one end 2a thereof and a cooling liquid inlet at the other end 2b thereof. The ends 2a and 2b and the coil lead wire 6 are disposed on the side of one end 100t of the stator coil module 100.

The mold member 3 has a substantially rectangular shape. A hole 1 a is formed in a center portion of the mold member 3. The stator coil 1 is so disposed as to surround the hole 1a. The stator coil 1 is constructed by winding a coil strand a plurality of times. The coil lead wire 6 is connected to the stator coil 1. Electric power is supplied to the stator coil 1 from the coil lead wire 6, whereby the stator coil 1 generates a magnetic field in such a direction as to penetrate the hole 1a.

The cooling pipe 2 is separated from the stator coil 1 and is disposed contiguous thereto. The cooling pipe 2 is formed in a "U"-shape and faces an outer peripheral face of the stator coil 1.

The cooling pipe 2 and the stator coil 1 are sealed by the mold member 3. It is required that the mold member 3 demonstrate insulating properties. The mold member 3 is made of an easily moldable material, for example, epoxy resin or the like. In addition, it is preferable that the mold member 3 exhibit a high thermal conductivity so as to diffuse heat generated by the stator coil.

Figure 2:
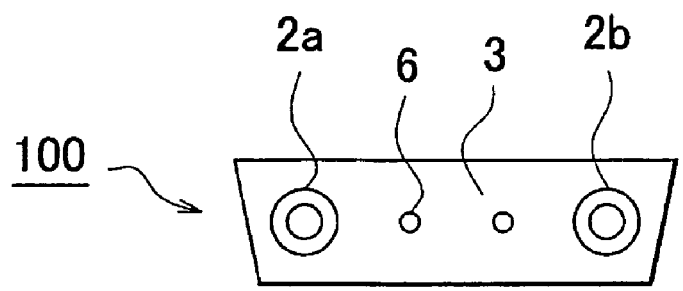
FIG. 2 is a front view of the stator coil module which is viewed from a direction indicated by an arrow II in FIG. 1.
Figure 3:
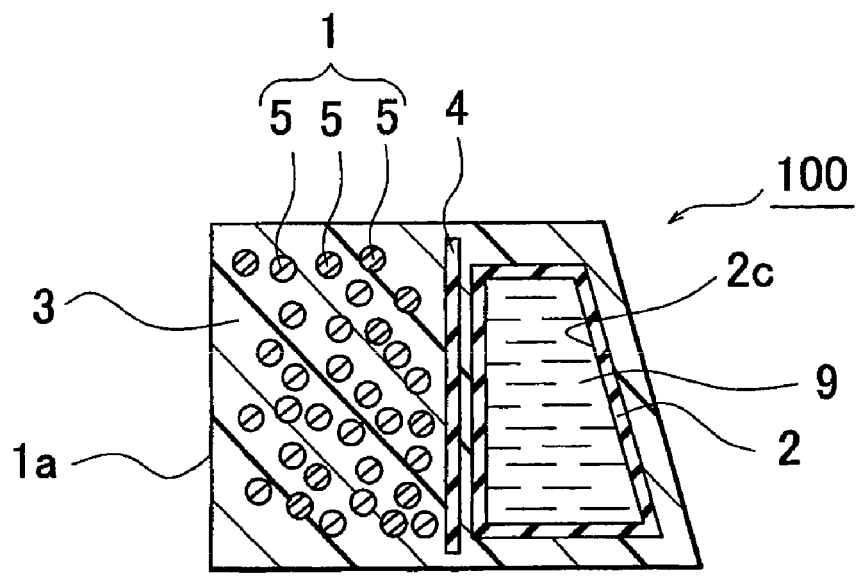
FIG. 3 is a cross-sectional view taken along a line III-III in FIG. 1.

FIG. 3 is a cross-sectional view taken along a line III-III in FIG. 1. Referring to FIG. 3, the stator coil module 100 is provided with the cooling pipe 2, the stator coil 1, an insulator 4, and the mold member 3. The cooling pipe 2 has an inner space 2c. The stator coil 1 is provided separately from the cooling pipe 2. The insulator 4 electrically insulates the cooling pipe 2 and the stator coil 1 from each other. The mold member 3 molds the stator coil 1, the insulator 4, and the cooling pipe 2.

The stator coil module 100 has a trapezoidal cross-section. The cooling pipe 2 also has a trapezoidal cross-section so as to correspond to the trapezoidal cross-section of the stator coil module 100. The cooling pipe 2 has the inner space 2c through which a cooling liquid 9 is caused to flow. The quality of the cooling liquid 9 is not limited in particular. For example, water, oil, or the like can be used as the cooling liquid 9. The insulator 4 is so disposed as to face the cooling pipe 2. It is to be noted herein that the insulator is not shown in FIG. 1.

The stator coil 1 is formed by winding a plurality of coil strands 5. The coil strands 5 are made of a metal exhibiting a low electrical resistance, such as copper, aluminum, or the like. A superconducting material can also be used as the coil strands 5. In the case where the superconducting material is used, a cooling liquid such as liquid nitrogen or the like is caused to flow through the cooling pipe 2.

Figure 4:
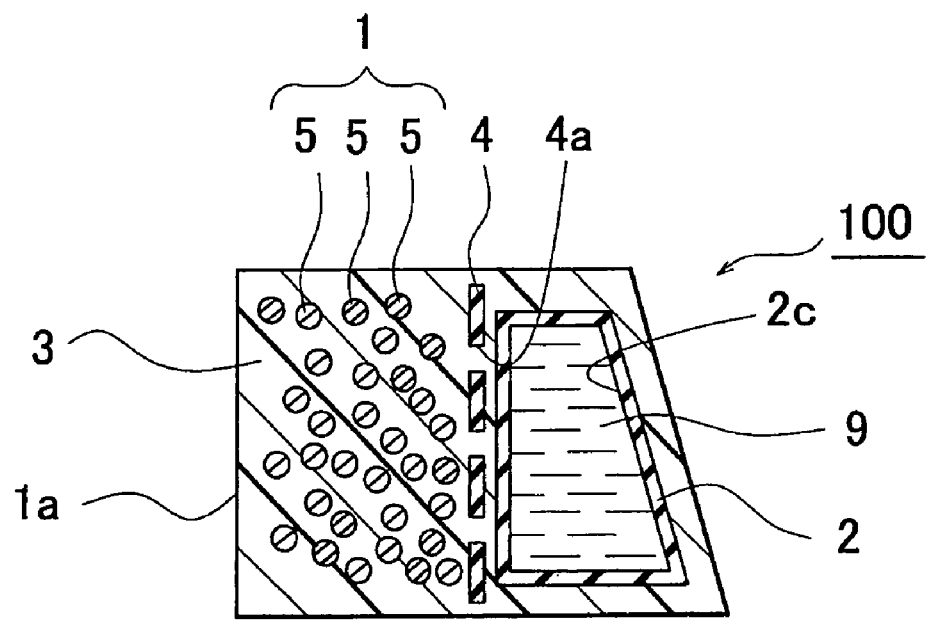
FIG. 4 is a cross-sectional view of a stator coil module in accordance with another phase of the invention and corresponds to FIG. 3.
Figure 5:
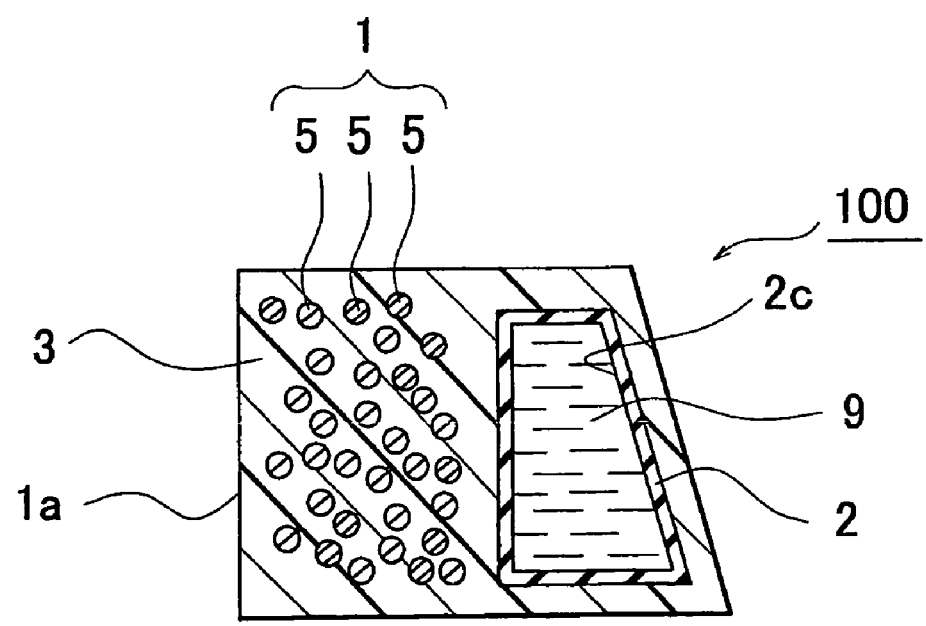
FIG. 5 is a cross-sectional view of a stator coil module in accordance with still another phase of the invention and corresponds to FIG. 3.

Each of FIGS. 4 and 5 is a cross-sectional view of a stator coil module in accordance with another phase of the invention. As shown in FIG. 4, a hole 4a may be formed in the insulator 4. The insulator 4 has a perforated or spacer-like structure. In such a structure, insulating performance (a distance) is ensured between the cooling pipe 2 and the coil strands 5, and the mold member 3 fills gaps between the cooling pipe 2 and the coil strands 5. This results in a reduction in thermal resistances of the stator coil 1 and the cooling pipe 2, so that an enhanced cooling capacity is obtained.

As shown in FIG. 5, an outer surface of the cooling pipe 2 may be coated with an insulating material in advance, or the insulator may be dispensed with by managing the positioning of the coil strands 5 at the time of molding. That is, while the insulating performance (distance) between the cooling pipe 2 and the coil strands 5 is ensured, the mold member 3 fills the gaps between the cooling pipe 2 and the coil strands 5. In this case, owing to a further reduction in the thermal resistances of the stator coil 1 and the cooling pipe 2, an excellent cooling capacity can be obtained.

In the stator coil module in accordance with the first embodiment of the invention as described above, the cooling pipe 2 and the stator coil 1 are integrally molded with resin before the stator coil is wound around the stator core. An operation of molding with resin can be completed before the stator coil module is mounted on a motor. Therefore, a process of molding with resin can be simplified.

In addition, the stator coil 1 is molded with resin such that the most part thereof becomes contiguous to the cooling pipe 2 in each of stator coil modules 100. This also leads to enhancement of a cooling efficiency of the stator coil 1. The stator coil 1 may be made of copper.

Figure 6:
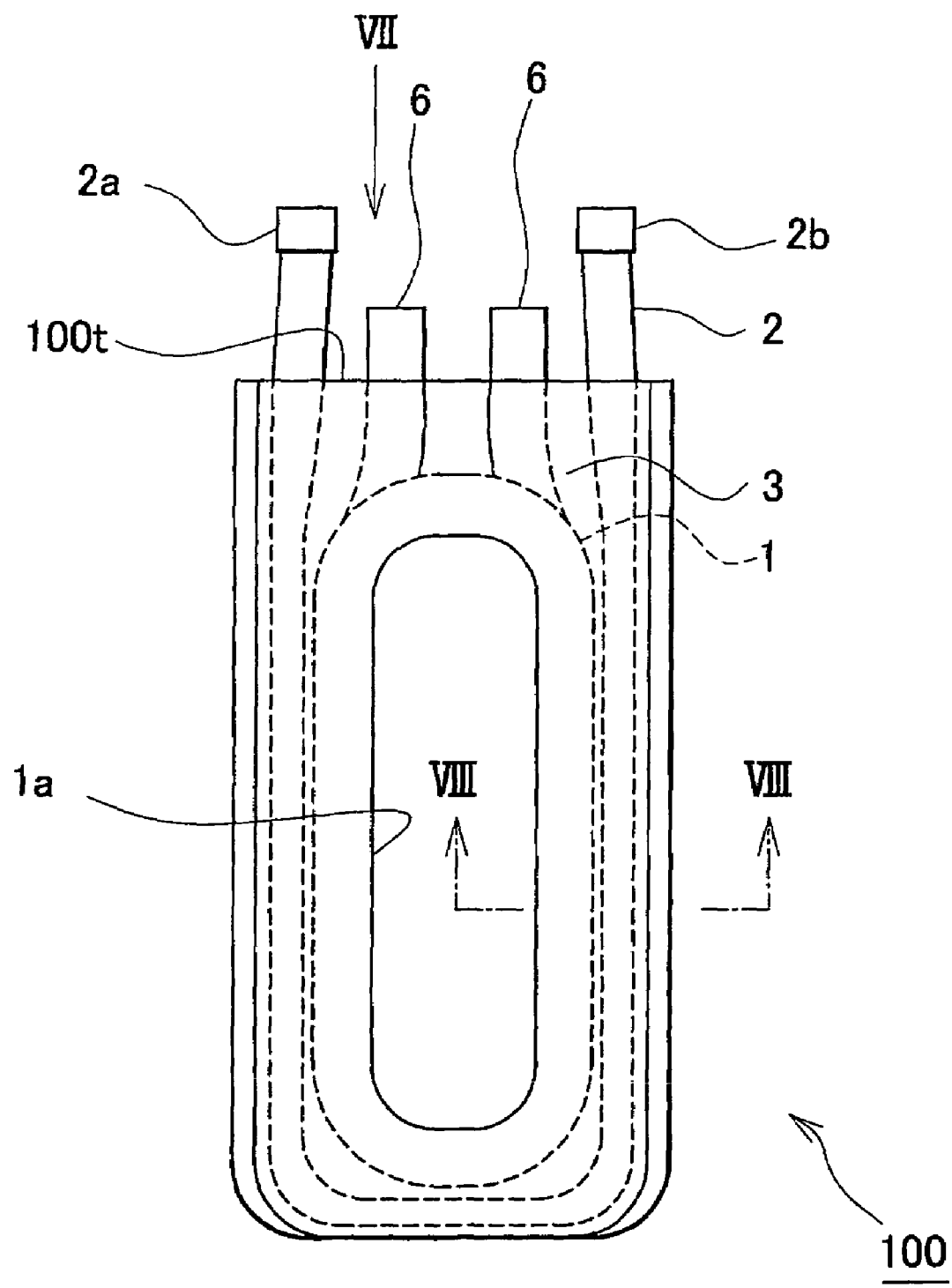
FIG. 6 is a plan view of a stator coil module in accordance with a second embodiment of the invention.
Figure 7:
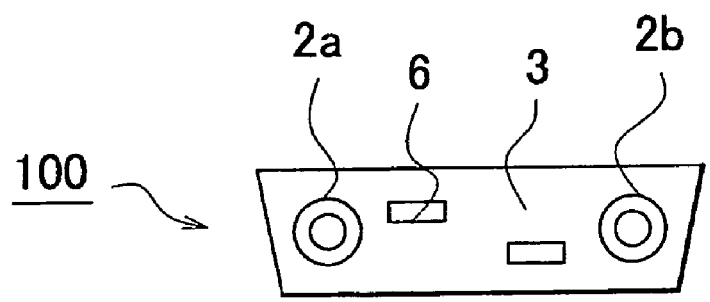
FIG. 7 is a front view of the stator coil module which is viewed from a direction indicated by an arrow VII in FIG. 6.
Figure 8:
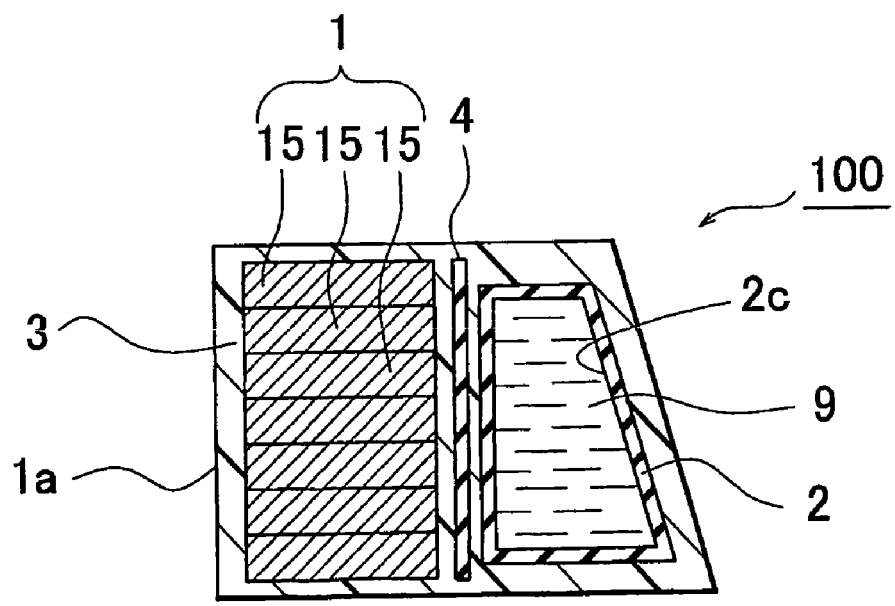
FIG. 8 is a cross-sectional view taken along a line VIII-VIII in FIG. 6.

The construction of a stator coil module in accordance with the second embodiment of the invention will be described with reference to FIGS. 6 to 8. This stator coil module 100 is different from the stator coil module in accordance with the first embodiment in that coil strands 15 constituting the stator coil 1 are rectangular in shape. As shown in FIG. 8, the coil strands 15 as rectangular wire materials are laminated and molded by the mold member 3. The use of the rectangular coil strands 15 makes it possible to reliably ensure a space for arrangement of the cooling pipe 2 while enlarging a cross-sectional area of conductive layers. The number of the coil strands 15 to be laminated is not limited as shown in FIG. 8. That is, a greater number of the coil strands 15 may be laminated. The coil lead wire 6 is also constructed of a rectangular wire material.

Figure 9:
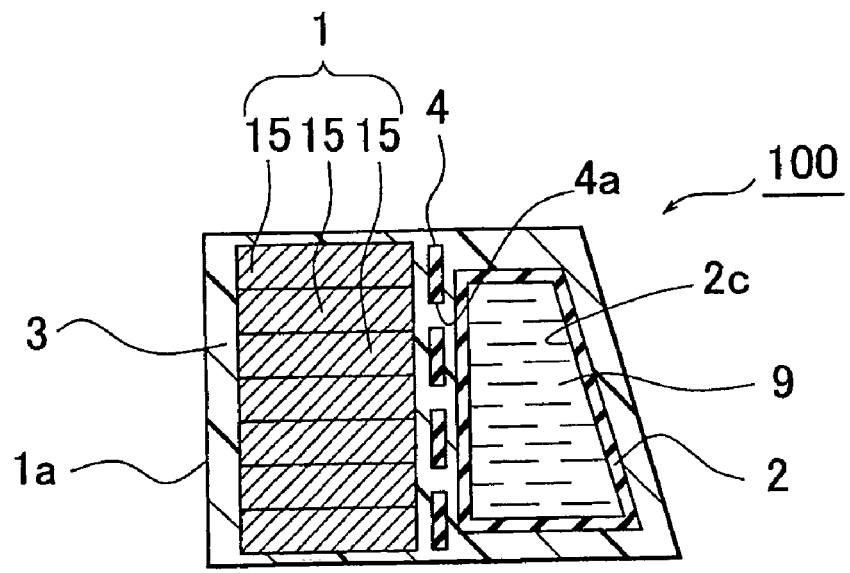
FIG. 9 is a cross-sectional view of a stator coil module in accordance with another phase of the invention and corresponds to FIG. 8.
Figure 10:
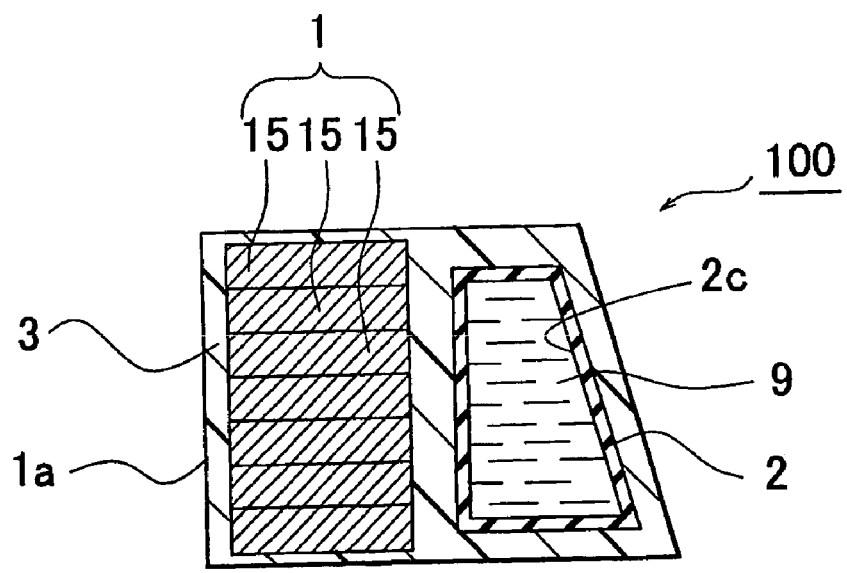
FIG. 10 is a cross-sectional view of a stator coil module in accordance with still another phase of the invention and corresponds to FIG. 8.

Each of FIGS. 9 and 10 is a cross-sectional view of a stator coil module in accordance with another phase of the aforementioned second embodiment. As shown in FIG. 9, the hole 4a may be formed in the insulator 4. This results in a reduction in thermal resistances of the stator coil 1 and the cooling pipe 2, so that an enhanced cooling capacity is obtained.

As shown in FIG. 10, there may be no insulator provided between the stator coil 1 and the cooling pipe 2. In this case, owing to a further reduction in the thermal resistances of the stator coil 1 and the cooling pipe 2, an enhanced cooling capacity can be obtained.

The stator coil module 100 thus constructed in accordance with the second embodiment has substantially the same effect as the stator coil module 100 in accordance with the first embodiment.

Figure 11:
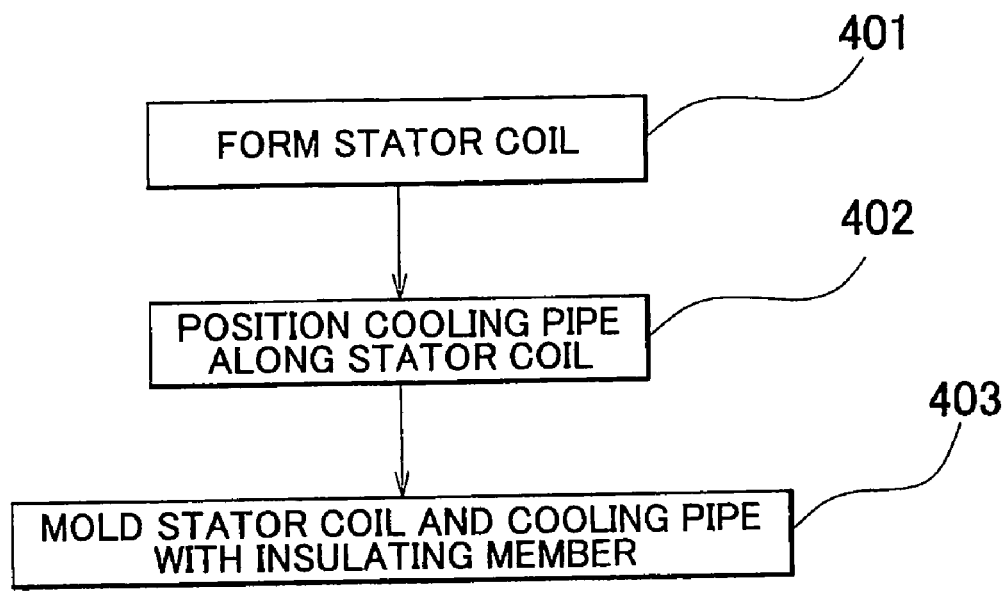
FIG. 11 shows a process of manufacturing the stator coil module in accordance with the first or second embodiment.

Next, a method of manufacturing the stator coil module in accordance with the first or second embodiment will be described. FIG. 11 shows a process of manufacturing the stator coil module in accordance with the first or second embodiment. First of all, the stator coil 1 is formed by winding the coil strands 5 or 15 (step 401). In forming the stator coil 1, the coil strands 5 or 15 may be wound around an outer periphery of a certain frame body. The number of turns of the coil strands 5 or 15 is not limited but suitably set in accordance with an output of the electric rotating machine. A diameter of the stator coil 1 is also suitably set in accordance with a dimension of the electric rotating machine.

Then, the cooling pipe 2 is so positioned as to extend along the stator coil 1 (step 402). At this moment, the insulator 4 may be provided between the stator coil 1 and the cooling pipe 2 as shown in FIGS. 3, 4, 8, and 9. On the other hand, there may be no insulator provided as shown in FIGS. 5 and 10.

Then, the stator coil 1 and the cooling pipe 2 are molded with the mold member 3 as an insulating member (step 403). At this moment, a molding flask is installed around the stator coil 1 and the cooling pipe 2, and resin as the mold member is injected into the molding flask. Resin molding is thereby completed, so that the stator coil module shown in each of FIGS. 1 to 10 is completed.

Figure 12:
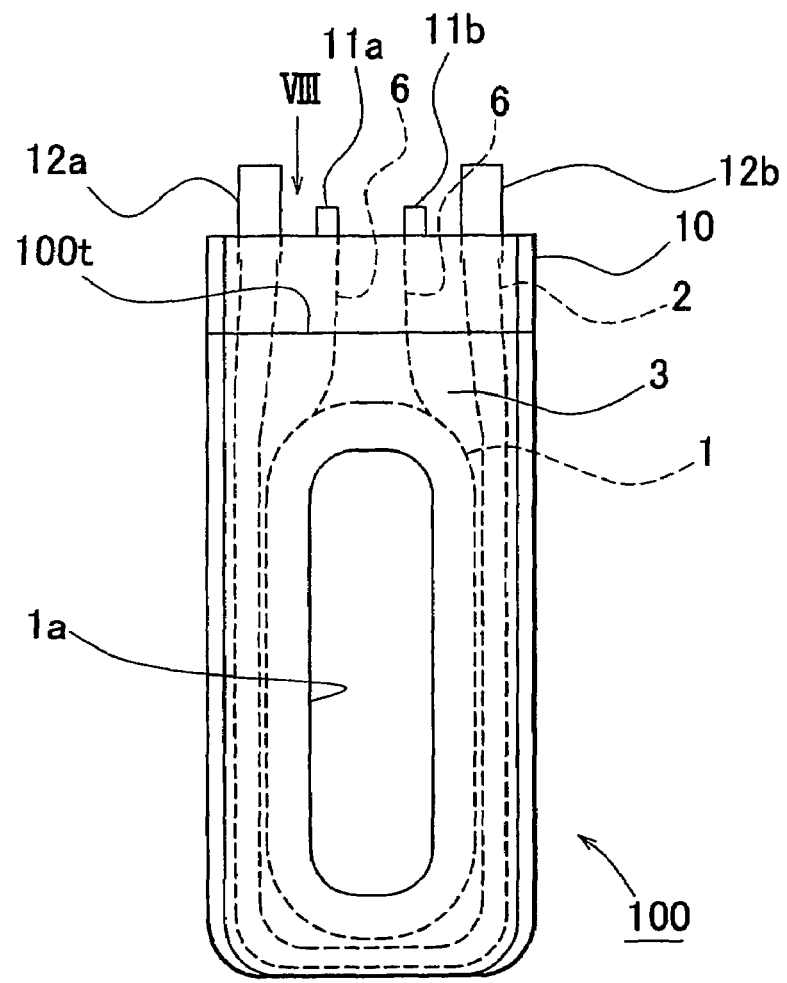
FIG. 12 is a plan view of a stator coil module in accordance with a third embodiment of the invention.
Figure 13:
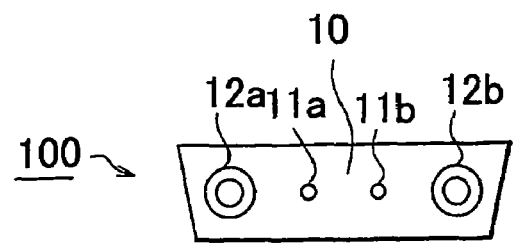
FIG. 13 is a front view of the stator coil module which is viewed from a direction indicated by an arrow XIII in FIG. 12.

The construction of a stator coil module in accordance with the third embodiment of the invention will be described with reference to FIGS. 12 and 13. A block 10 is provided on the side of one end 100t of this stator coil module 100. The cooling pipe 2 and the coil lead wire 6 penetrate the block 10. The coil lead wire 6 is connected to lead-wire connection ports 11a and 11b provided in the block 10. Ends of the cooling pipe 2 are respectively connected to cooling pipe connection ports 12a and 12b provided in the block 10. It is to be noted herein that substantially the same part as in the case of one of the stator coil modules of the first and second embodiments shown in FIGS. 1 to 10 is molded with the mold member 3. The block 10 corresponds to the connection block of the invention. The lead-wire connection ports 11a and 11b correspond to the conductive member connection portion of the invention. The cooling pipe connection ports 12a and 12b correspond to the cooling pipe connection portion of the invention.

The stator coil module in accordance with the third embodiment may be identical in cross-sectional shape with any one of those shown in FIGS. 3 to 5 and FIGS. 8 to 10.

In the case where the block 10 is installed, the stator coil 1 and the cooling pipe 2 are integrally molded with resin after the cooling pipe 2 and the coil lead wire 6 have been connected to the block 10 in advance.

The stator coil module 100 in accordance with the third embodiment has substantially the same effect as the stator coil modules in accordance with the first and second embodiment. In addition, an end face of the block 10, namely, that portion of the block 10 which is in contact with the mold member 3 serves as a sealing face, whereby the moldability of resin molding is enhanced. Because the lead-wire connection ports 11a and 11b and the cooling pipe connection ports 12a and 12b are formed in the block 10, a step of mounting a pipe line and a lead wire is omitted.

Figure 14:
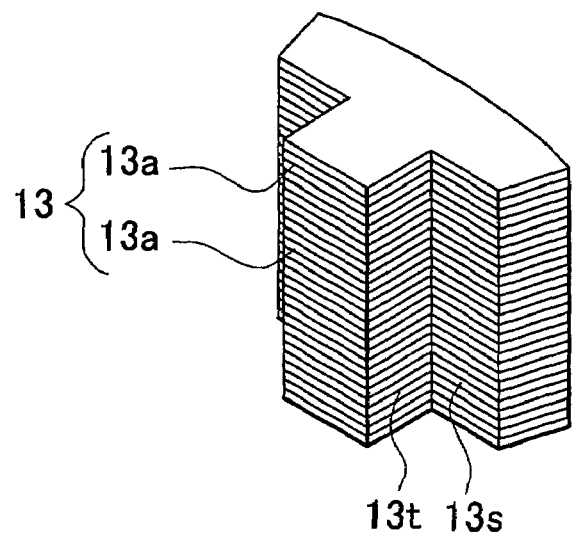
FIG. 14 is a perspective view of segmental cores employed in an electric rotating machine in accordance with a fourth embodiment of the invention.

The construction of a segmental core employed in an electric rotating machine in accordance with the fourth embodiment of the invention will be described with reference to FIG. 14. This segmental core 13 is formed by laminating a plurality of core plates 13a. The segmental core 13 has a pedestal face 13s constituting the circumference of a circle in terms of shape, and a protrusive face 13t protruding from the pedestal face 13s. The segmental core 13 assumes a "convex" shape. The segmental core is in the shape of an arc, except a protrusive portion thereof.

Figure 15:
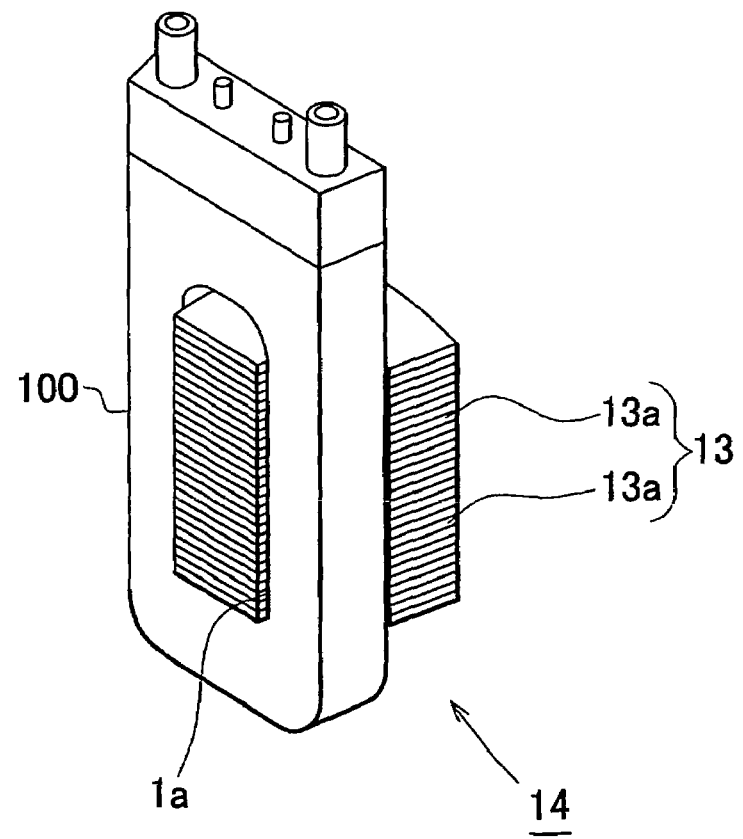
FIG. 15 is a perspective view of a cassette coil employed in an electric rotating machine in accordance with the fourth embodiment of the invention.

FIG. 15 is a perspective view of a cassette coil employed in the electric rotating machine in accordance with the fourth embodiment of the invention. Referring to FIG. 15, a cassette coil 14 has the stator coil module 100 in accordance with the third embodiment and the segmental core 13 fitted in the hole 1a of the stator coil module 100.

Although the stator coil module 100 in accordance with the third embodiment is employed herein, the stator coil module in accordance with the first or second embodiment (see FIGS. 1 to 10) may be employed instead. In this construction, the protrusive portion of the segmental core 13 is fitted in the hole 1a.

In the construction shown in FIG. 15, the cassette coil 14 may be molded with resin, integrally with the segmental core 13. In this case, the use of an insulator or a mold member 13 allows the cassette coil 14 and the segmental core 13 to be insulated from each other. This leads to a reduction in a thermal resistance between the stator coil 1 and the segmental core 13. As a result, the heat generated by the stator coil 1 is easily absorbed with the thermal capacity of the segmental core 13, and a period of short-time rating operation can be prolonged.

Furthermore, the segmental core 13 may be fitted into the hole 1a after the stator coil module having the hole 1 a has been manufactured.

The construction of an electric rotating machine in accordance with the fifth embodiment of the invention will be described with reference to FIGS. 16 and 17. An electric rotating machine 50 is in the shape of a circular cylinder. The lead-wire connection ports 11a and 11b and the cooling pipe connection ports 12a and 12b protrude from an end of the electric rotating machine 50. The lead-wire connection ports 11a and 11b are connected to a current distribution unit 21, while the cooling pipe connection ports 12a and 12b are connected to a cooling liquid distribution unit 22.

The current distribution unit 21 is provided with two terminals 21a and 21b, and is supplied with electric power therefrom. This electric power is divided by the current distribution unit 21 and is transmitted to the lead-wire connection ports 11a and 11b respectively.

Cooling liquid ports 22a and 22b are connected to the cooling liquid distribution unit 22. A cooling liquid is supplied from the cooling liquid port 22a. This cooling liquid is supplied to the cooling pipe 2 from one of the cooling pipe connection ports, namely, the cooling pipe connection port 12a of one cassette coil, and is discharged from the other cooling pipe connection port 12b. The discharged cooling liquid is caused to flow to a heat exchanger from the cooling liquid port 22b.

The electric rotating machine 50 has an outer frame 31, a stator 51 fixed to the outer frame 31, a rotor 33 facing the stator 51, and a rotational shaft 32 to which the rotor 33 is attached. The outer frame 31 is in the shape of a circular cylinder. The stator 51 is fixed to the interior of the outer frame 31. The stator 51 is composed of a plurality of (12 in FIG. 17) cassette coils 14. As shown in FIG. 15, each of the cassette coils 14 is composed of the segmental core 13 and the stator coil module 100. As shown in FIG. 10, the stator coil module 100 includes the coil strands 15 as rectangular wire materials and has no insulator. However, it is not absolutely required that the stator coil module 100 shown in FIG. 10 be used. Namely, any one of the stator coil modules 100 shown in FIGS. 3 to 5 and FIGS. 8 and 9 can be used. A winding axis of the stator coil 1 extends, for example, in a direction indicated by an arrow 41. The rotational shaft 32 extends in a direction perpendicular to the arrow 41 (perpendicular to the sheet of FIG. 17) as indicated by an arrow 42. Therefore, the winding axis of the stator coil 1 is unparallel to the rotational shaft 32 (i.e., intersects with the rotational shaft 32 or extends along a skew line with respect to the rotational shaft 32). Although the arrow 41 is perpendicular to the arrow 42 in FIG. 17, they may also form an acute angle or an obtuse angle.

The electric rotating machine 50 in accordance with the fifth embodiment is provided with the rotational shaft 32, the stator 51, and the cooling pipe 2. The rotational shaft 32 is fitted with the rotor 33. The stator 51 is provided around the rotational shaft 32. The cooling pipe 2 serves to cool the stator 51. The stator 51 includes the segmental core 13 as a stator core and the stator coil 1 that is wound around the segmental core 13 such that the winding axis of the stator coil 1 becomes unparallel to the rotational shaft 32. The cooling pipe 2 is provided separately from the stator coil 1 and is disposed along it.

Further, the electric rotating machine 50 is provided with the stator coil modules 100 and the segmental core 13 as a stator core which is fitted in the hole 1a of the stator coil module 100. The stator coil modules 100 fitted with the segmental core 13 constitute the cassette coils 14. The cassette coils 14 are disposed in a circumferential direction.

A required number of the cassette coils are disposed on the circumference of a circle. Each of the cassette coils 14 is fixed to the outer frame 31, for example, by welding.

In the thus-constructed electric rotating machine in accordance with the fifth embodiment, a step of winding the stator coil 1 is separated from a step of assembling the electric rotating machine 50. Therefore, the number of inconveniences related to the winding of the stator coil 1 can be reduced in a step of mounting the cassette coils 14.

If there is an inconvenience related to the winding of the stator coil 1, the cassette coils 14 can be individually checked during inspection. In the related art, the entire circular single core is scraped. In the fifth embodiment, however, there is no need to scrap more than one minimum unit of the cassette coils. This brings about an enhancement of the yield of the material and permits an overall reduction in cost.

Figure 16:
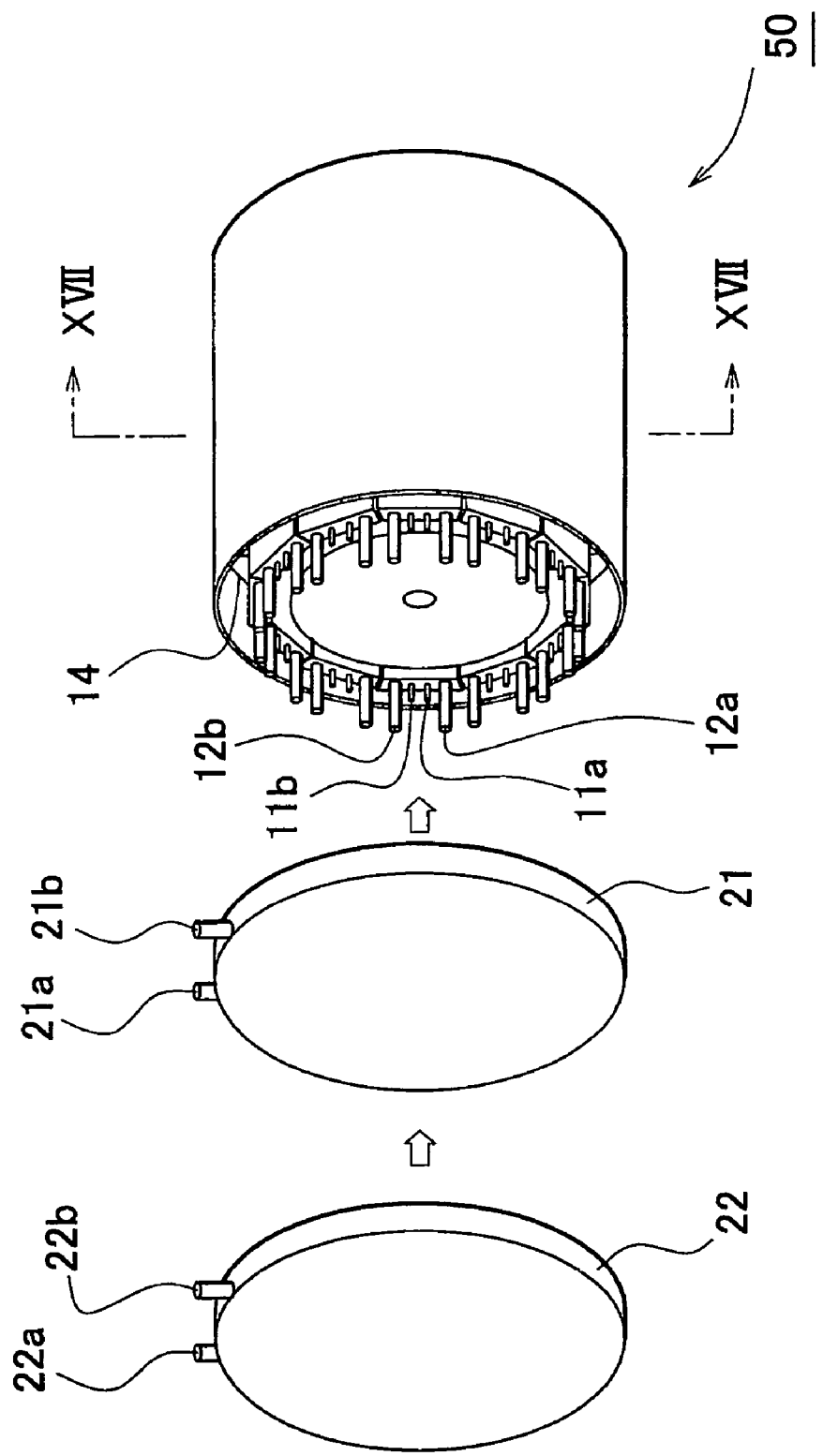
FIG. 16 is a perspective view of the electric rotating machine in accordance with the fourth embodiment of the invention.
Figure 17:
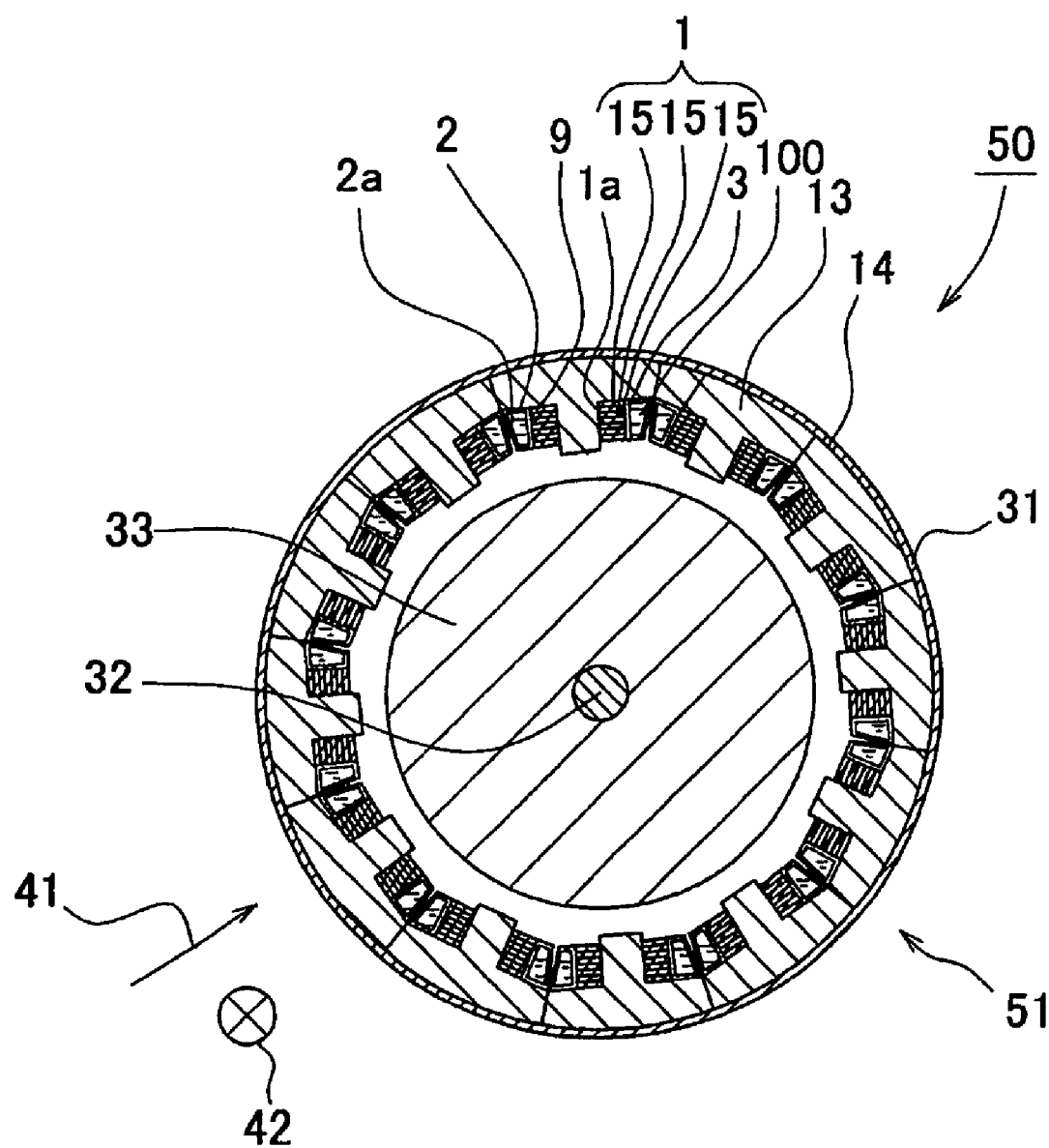
FIG. 17 is a cross-sectional view taken along an arrow XVII-XVII in FIG. 16.

In addition, the installation of an electric power distribution unit and the cooling liquid distribution unit as shown in FIG. 16 allows complicated steps of wiring and piping to be simplified. This leads to a reduction in cost and an improvement in reliability.

The electric rotating machine in accordance with the fifth embodiment employs the stator coil modules that exhibit a high cooling capacity as in the case of the first to third embodiments. An enhancement in cooling capacity makes it possible to increase a current density correspondingly. As a result, the electric rotating machine 50 can be provided as a compact, high-output machine.

Also, the enhancement in cooling capacity makes it possible to prolong a period of continuous operation. Moreover, the stator coil 1 is lowered in temperature, so that the degree of copper loss can be reduced.

The aforementioned embodiments can be modified in various manners. It is not absolutely required that the strands constituting the stator coil 1 be round or rectangular in cross-sectional shape. Namely, the strands may be elliptical in cross-sectional shape. Furthermore, the surface of each of the strands may be subjected to an insulating treatment.

It is not absolutely required that the insulator 4 be an insulative plate member. That is, the insulator 4 may be a flaky member.

The cooling pipe 2 may assume a cylindrical shape instead of the rectangular shape shown in the embodiments. Further, the cooling pipe 2 may be formed with an inconstant cross-sectional shape. The number of turns of the cooling pipe is not limited to one but may be two or more.

While the invention has been described with reference to the exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A stator coil module, comprising:
a stator coil formed by winding a coil strand a plurality of times;
the coil strand constituting the stator coil is rectangular in cross-sectional shape;
a substantially U-shaped cooling pipe that is provided separately from the stator coil and that is disposed along the stator coil, the U-shaped cooling pipe being positioned outside of the stator coil so that inner surfaces of the U-shaped cooling pipe surround outer surfaces of the stator coil;
a segmental core that has a protrusive face;
an insulating member that molds the stator coil and the cooling pipe and forms a hole in a space defined by an inner periphery of the stator coil; and
a molding member that molds the segmental core with the protrusive face in the hole.

2. The stator coil module according to claim 1, wherein
a conductive member connected to the stator coil for supplying the stator coil with electric power is further provided,
the cooling pipe has a cooling liquid outlet at one end thereof and a cooling liquid inlet at the other end thereof, and
the ends of the cooling pipe and the conductive member are disposed on the side of one end of the stator coil module.

3. The stator coil module according to claim 2, wherein
the conductive member is a coil lead wire.

4. The stator coil module according to claim 1, wherein
an insulator is provided between the stator coil and the cooling pipe.

5. The stator coil module according to claim 4, wherein
a plurality of holes are formed in the insulator.

6. The stator coil module according to claim 5, wherein
the holes are filled with the insulating member.

7. The stator coil module according to claim 1, further comprising:
a connection block having a cooling pipe connection portion for connecting the cooling pipe to an external object and a conductive member connection portion for connecting the conductive member to an external object.

* * * * *